United States Patent

Mui et al.

[15] 3,666,782

[45] May 30, 1972

[54] PROCESS FOR PRODUCING VINYLCHLOROSILANES

[72] Inventors: Jeffrey Y. P. Mui, Ossining, N.Y.; Everett W. Bennett, Longmeadow, Mass.

[73] Assignee: Union Carbide Corporation, New York, N.Y.

[22] Filed: Sept. 30, 1970

[21] Appl. No.: 76,986

[52] U.S. Cl. .................................260/448.2 E, 260/448.2 Q
[51] Int. Cl. ..................................................C07f 7/14
[58] Field of Search ............................260/448.2 E, 448.2 Q

[56] References Cited

UNITED STATES PATENTS

| | | | |
|---|---|---|---|
| 2,770,634 | 11/1956 | Weyenberg | 260/448.2 E |
| 2,800,494 | 7/1957 | Haluska | 260/448.2 E |
| 3,560,541 | 2/1971 | Graf et al. | 260/448.2 E |

OTHER PUBLICATIONS

Voorhoeve, " Organohalosilanes," Elsevier Publishing Co., N.Y. (1967), pps. 42, 46, 47.

*Primary Examiner*—Daniel E. Wyman
*Assistant Examiner*—P. F. Shaver
*Attorney*—Paul A. Rose, Aldo John Cozzi, Eugene C. Trautlein and George A. Skoler

[57] ABSTRACT

There is described herein a process for making vinylchlorosilanes by a vapor phase reaction between vinyl chloride and chlorosilicon hydrides. The advantage of this process is that it achieves such reaction at relatively low reaction temperature such as below about 500° C so that reaction can be practiced in reactors made of metals without deleterious attack by by-product hydrogen chloride. Numerous other advantages are cited for the process.

4 Claims, No Drawings

PROCESS FOR PRODUCING VINYLCHLOROSILANES

This invention relates to a process for the manufacture of vinylchlorosilanes, particularly vinyl trichlorosilane and vinyl hydrocarbylchlorosilanes. The process of this invention involves the vapor phase reaction of vinyl chloride with trichlorosilane ($HSiCl_3$) and hydrocarbylchlorosilane hydrides ($R_nHSiCl_{3-n}$). The process of this invention involves the aforesaid vapor phase reaction carried out at a temperature of from about 400° to about 500° C.

The vapor phase reaction between vinyl chloride and chlorosilicon hydrides is described in the scientific literature and in U.S. Pat. No. 2,770,634. In each instance, the prior art requires that the reaction be carried out at a temperature between 550° and 650° C., inclusive. The U.S. Patent also specifies that the contact time or the reaction time at the specified temperature be at least 2 seconds. In addition, the U.S. Patent specifies that if the reaction is carried out at a temperature below 550° C., "little or no reaction takes place" (See col. 2, line 15 of the U.S. Pat. No. 2,770,634).

Duplication of the prior art effort has shown the following facts to exist. When the reaction is carried out at above about 550° C., it is most desirable, if not necessary, to keep the contact time within the range of about 5 seconds to about 10 seconds. Contact time means the residence time of the reactants in the reaction zone at the aforementioned temperatures. When the contact time or residence time at such temperatures exceeds 10 seconds, there is noted decomposition of both the chlorosilicon hydride and the vinyl chloride starting materials. Carbonization of the vinyl chloride occurs, as well as decomposition of the chlorosilicon hydride to silicon metal, HCl and/or silicon chloride. The result is an off-colored product possessing little commercial utility when one considers the present standards of the industry. In addition, when the residence time exceeds 10 seconds, the yields of vinylchlorosilane product drops significantly. A residence time of less than 5 seconds would be very desirable when using such high reaction temperatures, but such residence times are believed impractical to achieve. The through-put of the reactants at such low residence times would be so great as to require excess temperatures in order to bring the reactants to the desired reaction temperature within the specified residence times. One might believe that by preheating the reactants such residence times could be achieved. This might be so, but considering the decomposition rates of the chlorosilicon hydrides and the susceptibility of vinyl chloride to carbonization at such temperatures, the overall scheme of preheating is not without substantial difficulties in order to perfect.

However, there is one serious limitation to all of the schemes for the vinyl chloride-chlorosilicon hydride reactions as set forth in the prior art. A major by-product of the reaction is hydrogen chloride. At the temperatures of the reaction zone, that is, temperatures in excess of about 550° C., HCl is an extremely corrosive material particularly towards metals. Experimental efforts with steel and copper reactors at such temperatures substantiates significant reaction with the reactor walls forming metal halide products. In addition, the metal halide products are dissolved in the reaction products and discolor them significantly. For all practical purposes, the only suitable reactor in which the aforementioned prior art reaction can be carried out is one which is made of heat resistant glass or quartz. Such reactors for a commercial operation are economically prohibitive to justify utilization of the reaction.

In summary, the prior art specifies that the vapor phase reaction of vinyl chloride and chlorosilicon hydrides should be conducted at a temperature not less than 550° C. and the residence time of the reaction should be not less than 2 seconds. Experimental evidence establishes that the reaction when carried out as specified, that is, at 550° C. and above should have a residence time ranging between 5 seconds to about 10 seconds. In addition, the reactor must be made of glass or quartz. A further factor that was established by experimentation was that the reaction should be carried out with essentially equal mole amounts of vinyl chloride and chlorosilicon hydride, otherwise substantial losses of starting material occur. For example, if the chlorosilicon hydride is employed in excess, there occurs a substantial amount of by-product chlorosilanes as well as a number of other unidentifiable heavies. When vinyl chloride is employed in excess a substantial amount of carbonization occurs resulting in off-colored product. Thus the utilization of temperatures in excess of 550° C. to effect the vapor phase reaction creates numerous problems and they smother the potential advantages of the reaction.

Contrary to the expressions of the prior art, the vapor phase reaction between vinyl chloride and trichlorosilane or hydrocarbylchlorosilane hydrides can be effected at temperatures allowing the use of metal reactors, comfortable residence times, minimum criticality in the ratio of starting materials, exceptionally high yields and high conversions, easy handling, minimal purity problems and a substantial reduction in the overall cost in effecting the reaction. It has been surprisingly found, and in accordance with this invention, that vinyl chloride can be reacted with trichlorosilane or hydrocarbylchlorosilane hydrides at a temperature of from about 400° to about 500° C., preferably from about 440° to about 500° C. The reaction is most conveniently carried out at a residence time of at least about 5 seconds, preferably at least about 10 seconds, and typically not in excess of about 50 seconds. In the typical case, the reaction is most desirably carried out at a residence time ranging between about 10 seconds to about 35 seconds. In addition, the reaction can be carried out with large excesses of either one of the reactants because side reactions are minimized at these temperatures. Most desirably, the reaction is carried out with an excess amount of the chlorosilicon hydride reactant in order to insure complete or essentially complete reaction of the vinyl chloride fed to the reaction. In addition, when the reaction is carried out under appropriate conditions, it is effected with a minimum amount of by-product formation and achieves yields, based upon the amount of chlorosilicon hydride fed to the reaction, frequently in excess of 90 mole per cent and yields as high as 97 mole per cent have been obtained. Since there are many metals which are resistant to HCl corrosion at temperatures below about 500° C., this reaction can be effected in metal reactors which can be cheaply built compared to the glass and quartz reactors required in the prior art process.

The chlorosilane hydrides treatable in accordance with this invention include trichlorosilane ($HSiCl_3$) and $$R_nHSiCl_{3-n}$$

wherein R is a hydrocarbyl group such as alkyl of one to about five carbon atoms, aryl, such as phenyl and alkyl substituted phenyl (such as para-methylphenyl) and aralkyl, and $n$ is 1 or 2. Illustrative hydrocarbylchlorosilane hydrides include methyldichlorosilane, ethyldichlorosilane, n-propyldichlorosilane, isopropyldichlorosilane, n-butyldichlorosilane, n-amyldichlorosilane, dimethylmonochlorosilane, methylethylmonochlorosilane, diethylmonochlorosilane, ethyl n-propylmonochlorosilane, di-n-amylmonochlorosilane, phenyldichlorosilane, phenylmethylmonochlorosilane, diphenylmonochlorosilane, tolylmethylmonochlorosilane, xylyldichlorosilane, 4-amylphenyldichlorosilane, 2-phenylethyldichlorosilane and the like.

The reaction involves the intermixture of vinyl chloride and the chlorosilane hydride at temperatures between about 400° and about 500° C. The reaction can be effected at subatmospheric, atmospheric or superatmospheric pressure. All experimental data accumulated suggests there are no pressure limitations on the operativeness of the process. Since the reaction rates are relatively fast so that the residence time is short, as defined previously, pressure can play a significant part in determining productivity. As one increases pressure in a continuous tube reaction while maintaining the residence time, the productivity of the reaction is increased. The only apparent limitation is a practical one of insuring effective heating of the reaction zone to bring the reactants within the process temperature range when the reactants are being force fed to the reaction zone.

The nature of the reaction zone is not narrowly critical to effect the reaction. All that is necessary is that the reaction zone be of such design as to allow effective heating and intermixture of the reactants. This need not be a problem if the reactants are intermixed at reduced temperatures outside the reaction zone and fed as a mixture to the reaction zone. Then the only problem becomes the ability to bring the reaction zone to the desired reaction temperature. Most effective for this purpose is to employ a relatively small diameter reaction zone which can be contact heated by either electrical resistance heating or gas fire heating, and the like, to bring the temperature of the reaction zone in the range of between about 400° to about 500° C. In some instances, it may be desirable to preheat the reactants either alone or while in admixture to a temperature below which interreaction occurs or decomposition of either one of the reactants occurs. For example, if the reactants are preheated while intermixed, it is preferred that the preheat temperature be below the temperature at which any interreaction occurs. If the reactants are preheated separately and mixed for the first time in the reaction zone, then the preheat temperature should be below that at which decomposition of either of the reactants occurs. One reactant can be preheated to a higher temperature than the other.

The reaction may be effected in a tubular reactor, such as an elongated pipe made of corrosion resistant metal such as stainless steel, steel-nickel alloys, and the like. In commercial operation, employing the process described herein, the reactor is preferably constructed of a metal which is noted for its resistance to HCl corrosion at elevated temperatures.

In order to describe this invention in greater detail reference is made to the following examples. The examples serve to illustrate this invention and are not intended for the purpose of limiting the invention.

The following tables describe on each line thereof an example utilizing the conditions there set forth. The reactions were carried out at the temperatures and the various flow rates of the reactants specified in the table. Two different size hot tube reactors were used: a Pyrex glass reactor having a reaction zone volume of 1850 cubic centimeters (1.4 inches inside diameter by 80 inches in length) and a smaller reactor made of stainless steel having a three-fourths inch inside diameter and being 60 inches in length. The reactants, that is, the chlorosilane hydride (as indicated in each table) and vinyl chloride were separately metered into the reactors. Each reactor was electrically heated to the desired temperatures by wrapping an electrically heated wire about the exterior of the reactor. The reactants were mixed with the reactor just prior to the reaction zone and for a very short time were preheated in the initial portion of the reactors to a temperature below that of the reaction zone. The exit vapor from the reactor was, in every case, analyzed after it was cooled by an air condenser to low temperature vapor products by keeping the condenser at a temperature above the boiling point of such products. The vapor products were analyzed by vapor phase chromatography and the results for each run are set forth in the table.

The contact times set forth in the table were calculated in seconds based on an assumption of ideal gas behavior of the gaseous molecules in the reactor under the experimental conditions. The contact times set forth in the table are the equivalent of the residence time of the gases in the reaction zone.

Conversion and yield as employed in the examples were determined as follows:

Conversion: per cent Vinyl chlorosilane product divided by per cent Chlorosilane hydride charged Yield: per cent Vinyl chlorosilane product divided by per cent Chlorosilane hydride consumed In the examples "Vi" means vinyl; "Et" means ethyl and "Me" means methyl.

TABLE I

Reaction of $HSiCl_3 + CH_2=CHCl$ at 450° C. at atmospheric pressure (Pyrex glass)

| Example number | $HSiCl_3$:ViCl[1] ratio | Feed reactant/min. $HSiCl_3$, M moles[2] | ViCl,[1] M moles[2] | Total M moles[2] | Contact time, seconds | $HSiCl_3$ conversion, percent | $ViSiCl_3$ yield, percent | $SiCl_4$ yield, percent | Side product yield, percent | $ViSiCl_3$:$SiCl_4$ ratio |
|---|---|---|---|---|---|---|---|---|---|---|
| 1 | 1 | 39.4 | 39.4 | 78.8 | 23.7 | 45.5 | 94.4 | 2.5 | 3.0 | 59 |
| 2 | 1 | 28.5 | 28.5 | 56.9 | 32.6 | 55.6 | 93.3 | 3.0 | 4.0 | 33 |
| 3 | 1 | 21.4 | 21.4 | 42.8 | 43.3 | 58.0 | 94.0 | 3.0 | 3.0 | 32 |
| 4 | 1 | 11.4 | 11.4 | 22.8 | 81.2 | 64.5 | 90.5 | 4.1 | 5.3 | 22 |

[1] Vinyl chloride. [2] Millimoles.

TABLE II

Reaction of $HSiCl_3 + CH_2=CHCl$ at 500° C. at atmospheric pressure (Pyrex glass)

| Example number | $HSiCl_3$:ViCl ratio | Reactant/min. $HSiCl_3$, M moles | ViCl, M moles | Total M moles | Contact time, seconds | $HSiCl_3$ conversion, percent | $ViSiCl_3$ yield, percent | $SiCl_4$ yield, percent | Side product yield, percent | $ViSiCl_3$:$SiCl_4$ ratio |
|---|---|---|---|---|---|---|---|---|---|---|
| 5 | 1.0 | 77.0 | 77.0 | 154.0 | 12.0 | 62.5 | 94.0 | 3.1 | 2.9 | 32 |
| 6 | 1.0 | 58.0 | 58.0 | 116.0 | 16.0 | 79.5 | 94.0 | 3.0 | 3.0 | 31 |
| 7 | 1.0 | 38.0 | 37.0 | 75.0 | 24.8 | 83.0 | 91.5 | 4.1 | 4.4 | 22 |
| 8 | 1.0 | 34.0 | 34.0 | 68.0 | 27.0 | 87.0 | 90.8 | 4.3 | 4.9 | 21 |
| 9 | 1.0 | 24.0 | 24.0 | 48.0 | 39.0 | 89.0 | 88.0 | 4.5 | 7.5 | 20 |
| 10 | 1.6 | 48.5 | 29.5 | 78.0 | 23.7 | 68.0 | 93.0 | 4.4 | 2.6 | 21 |
| 11 | 2.0 | 77.0 | 38.4 | 115.0 | 16.0 | 45.7 | 95.3 | 4.3 | 0.6 | 22 |
| 12 | 0.91 | 33.6 | 37.0 | 70.6 | 26.1 | 91.2 | 90.3 | 3.3 | 6.4 | 26 |

TABLE III

ViCl—$HSiCl_3$ reaction at 18 lbs. (p.s.i.g.) (Stainless steel reactor)

| Example number | Temp., °C. | Contact time (sec.) | Initial ratio $HSiCl_3$/ViC. | Percent ViCl | $HSiCl_3$ | $SiCl_4$ | $ViSiCl_3$ | $EtSiCl_3$ | Heavies | Conversion | Yield |
|---|---|---|---|---|---|---|---|---|---|---|---|
| 13 | 460 | 10 | 1.25 | 40.6 | 36.0 | 1.5 | 20.8 | | 0.9 | 36 | 93 |
| 14 | 460 | 20 | 1.25 | 31.4 | 19.7 | 3.2 | 52.4 | | 0.9 | 64 | 93 |
| 15 | 460 | 40 | 1.25 | 26.9 | 12.1 | 4.4 | 51.0 | 0.3 | 4.4 | 71 | 85 |
| 16 | 490 | 10 | 1.25 | 32.4 | 30.5 | 1.6 | 33.8 | Tr | 1.4 | 50 | 92 |
| 17 | 490 | 10 | 1.25 | 31.6 | 29.3 | 1.9 | 34.5 | 0.1 | 2.3 | 51 | 88 |
| 18 | 490 | 20 | 1.25 | 24.5 | 16.2 | 3.1 | 51.9 | 0.1 | 3.6 | 69 | 88 |
| 19 | 490 | 20 | 1.25 | 19.7 | 9.6 | 4.3 | 59.4 | 0.3 | 6.6 | 74 | 84 |
| 20 | 490 | 40 | 1.25 | 20.6 | 9.5 | 4.4 | 59.7 | 0.2 | 4.5 | 76 | 87 |
| 21 | 490 | 40 | 1.25 | 20.4 | 6.6 | 5.2 | 59.6 | 0.4 | 6.5 | 76 | 83 |
| 22 | 490 | 10 | 1.5 | 9.5 | 30.7 | 3.6 | 51.8 | 0.3 | 3.6 | 57 | 87 |
| 23 | 490 | 20 | 1.5 | 1.5 | 15.7 | 6.8 | 66.0 | 1.0 | 7.8 | 68 | 81 |

TABLE IV
ViCl-HMeSiCl₂ reaction at 18 lbs. (p.s.i.g.)
(Stainless steel reactor)

| Example number | Temp., °C. | Contact time (sec.) | Initial ratio MeHSiCl₃/ViCl | Percent | | | | | | | | |
|---|---|---|---|---|---|---|---|---|---|---|---|---|
| | | | | ViCl | HMeSiCl₂ | SiCl₄ | MeSiCl₃ | MeViSiCl₂ | MeEtSiCl₂ | Hvs. | Conv. | Yield |
| 24 | 460 | 10 | 1.25 | 45.1 | 36.1 | .2 | 1.7 | 16.2 | .1 | .6 | 31 | 86 |
| 25 | 460 | 20 | 1.25 | 32.9 | 32.5 | .2 | 2.4 | 27.3 | .2 | 2.5 | 42 | 84 |
| 26 | 460 | 20 | 1.25 | 29.1 | 35.1 | .3 | 2.6 | 29.1 | .2 | 3.0 | 41 | 83 |
| 27 | 460 | 40 | 1.25 | 30.4 | 23.2 | .2 | 4.2 | 39.1 | .3 | 2.4 | 56 | 85 |
| 28 | 490 | 10 | 1.25 | 32.7 | 34.2 | .2 | 2.7 | 27.8 | .1 | 2.1 | 41 | 85 |
| 29 | 490 | 20 | 1.25 | 27.0 | 28.9 | .3 | 3.5 | 35.4 | .3 | 3.0 | 50 | 83 |
| 30 | 490 | 20 | 1.25 | 24.8 | 29.7 | .2 | 3.8 | 37.2 | .3 | 2.7 | 50 | 84 |
| 31 | 490 | 40 | 1.25 | 22.7 | 29.4 | .6 | 5.3 | 45.7 | .5 | 3.3 | 59 | 83 |

TABLE V
Vinyl chloride-methyldichlorosilane reaction at atmospheric pressure (Stainless steel reactant)

| Example number | Temp., °C. | Contact time (sec.) | Percent | | | | | | | | | | |
|---|---|---|---|---|---|---|---|---|---|---|---|---|---|
| | | | Lites | ViCl | MeSiHCL₂ | SiCl₄ | MeSiCl₃ | MeViSiCl₂ | MeEtSiCl₂ | Hvs. | Yield | Conversion |
| 32 | 480 | 5 | Tr | 33.3 | 39.7 | .1 | 1.5 | 23.6 | Tr | 1.7 | 93 | 36 |
| 33 | 480 | 10 | .7 | 24.9 | 33.0 | -- | 6.2 | 33.0 | .1 | 2.2 | 84 | 46 |
| 34 | 480 | 20 | .9 | 22.1 | 26.7 | -- | 6.6 | 39.8 | .2 | 3.6 | 85 | 54 |
| 35 | 480 | 40 | 1.0 | 14.7 | 33.2 | .7 | 5.7 | 42.0 | .3 | 3.4 | 86 | 51 |
| 36 | 460 | 5 | -- | 39.7 | 40.0 | .1 | 1.3 | 17.9 | -- | 1.2 | 93 | 31 |
| 37 | 460 | 10 | Tr | 35.4 | 38.0 | .2 | 2.3 | 23.2 | .1 | .8 | 90 | 36 |
| 38 | 460 | 20 | .8 | 18.5 | 51.7 | .2 | 2.3 | 25.0 | .1 | 1.4 | 91 | 32 |
| 39 | 460 | 40 | .2 | 25.1 | 38.2 | .2 | 3.1 | 30.2 | .1 | 2.7 | 90 | 42 |

TABLE VI
Vinyl chloride-trichlorosilane reaction at atmospheric pressure
(Stainless steel tube)

| Example number | Temp., °C. | Contact time (sec.) | Percent | | | | | | | | |
|---|---|---|---|---|---|---|---|---|---|---|---|
| | | | Lites | ViCl | HSiCl₃ | SiCl₄ | ViSiCl₃ | EtSiCl₃ | Heavies | Conversion | Yield |
| 40 | 495 | 5 | -- | 20.5 | 23.7 | 3.4 | 50.9 | -- | 1.3 | 65 | 94 |
| 41 | 495 | 9 | -- | 8.5 | 22.4 | 4.9 | 60.7 | -- | 2.9 | 69 | 92 |
| 42 | 495 | 18 | .8 | 14.7 | 12.8 | 3.2 | 64.9 | .1 | 3.5 | 80 | 95 |
| 43 | 460 | 5 | -- | 43.3 | 43.0 | 0.5 | 12.5 | -- | 0.3 | 22 | 96 |
| 44 | 460 | 9 | -- | 26.0 | 50.8 | 2.1 | 19.1 | -- | 1.5 | 27 | 90 |
| 45 | 460 | 18 | -- | 24.8 | 21.5 | 1.6 | 49.5 | Tr | 2.1 | 68 | 97 |

What is claimed is:

1. The process for the manufacture of vinyl-chlorosilanes which comprises providing vinyl chloride with a chlorosilicon hydride in a reaction zone at a temperature of from about 400° to about 500° C for a period of time sufficient to cause reaction to produce vinylchlorosilane, remove the vinylchlorosilane from the reaction zone and recovering same.

2. The process of claim 1 wherein the chlorosilicon hydride is trichlorosilane.

3. The process of claim 2 wherein the reaction zone temperature is from about 440° to about 500° C., and the residence time of the reactants and the product of the reaction in the reaction zone is at least about 5 seconds.

4. The process of claim 3 wherein the reaction zone is contained in a metal reactor.

* * * * *

UNITED STATES PATENT OFFICE
CERTIFICATE OF CORRECTION

Patent No. 3,666,782          Dated May 13, 1972

Inventor(s) Jeffrey Y. P. Mui et al

It is certified that error appears in the above-identified patent and that said Letters Patent are hereby corrected as shown below:

In Table III, "HSiCl$_3$/ViC." should read --HSiCl$_3$/ViCl--; under ViSiCl$_3$, "59.4" should read --59.3--. In Table IV, under HMeSiCl$_2$, "29.4" should read --21.4--.

Signed and sealed this 31st day of December 1974.

(SEAL)
Attest:

McCOY M. GIBSON JR.
Attesting Officer

C. MARSHALL DANN
Commissioner of Patents